United States Patent [19]

Sease

[11] Patent Number: 4,788,806
[45] Date of Patent: Dec. 6, 1988

[54] ASSEMBLY OF MOLDING STRIPS ADAPTED TO MOUNT FLEXIBLE COVERINGS ON SUPPORT SURFACES

[76] Inventor: R. Gregg Sease, 6457 S. Heritage Pl. West, Englewood, Colo. 80111

[21] Appl. No.: 841,593

[22] Filed: Mar. 20, 1986

[51] Int. Cl.$^4$ .................. A47W 13/00; E04B 1/00
[52] U.S. Cl. ........................... 52/222; 52/716; 24/459; 160/395
[58] Field of Search .................. 52/202, 203, 222, 273, 52/716–718, 410, 465, 468, 710; 24/455–462; 160/327, 368 R, 392–397, 354

[56] References Cited

U.S. PATENT DOCUMENTS

| | | | |
|---|---|---|---|
| 3,822,734 | 7/1974 | Tombu | 160/397 X |
| 3,833,046 | 9/1974 | Tombu | 160/395 X |
| 4,447,935 | 5/1984 | Ausnit | 160/327 X |
| 4,453,585 | 6/1984 | Ruggeberg, Sr. et al. | 160/354 |
| 4,472,862 | 9/1984 | Bloomfield et al. | 160/392 X |
| 4,566,236 | 1/1986 | Pound | 52/222 |
| 4,631,882 | 12/1986 | Sease | 52/222 |
| 4,665,670 | 5/1987 | Van Der Berg | 52/222 |

FOREIGN PATENT DOCUMENTS 2820731 11/1978 Fed. Rep. of Germany ........ 52/222

Primary Examiner—David A. Scherbel
Assistant Examiner—Richard E. Chilcot, Jr.
Attorney, Agent, or Firm—Timothy J. Martin; J. Preston Oxenham

[57] ABSTRACT

A molding strip assembly is provided to secure a flexible covering on a support surface. The assembly includes a molding element attachable to the surface, and a mounting element that snap-fits into and is secured by the molding element. Each molding element has a retaining channel to lockably receive a latching structure that projects downwardly from a support wall of the mounting element. The covering may extend along the support wall and be retained by the latching structure. Prefabricated contour elements may be used at angular intersections of two or more molding elements, and an optional base molding element may be used to form routing channels for electrical wires. Molding strip assemblies are combined into framework systems to cover wall or other surface areas with great flexibility of design.

10 Claims, 11 Drawing Sheets

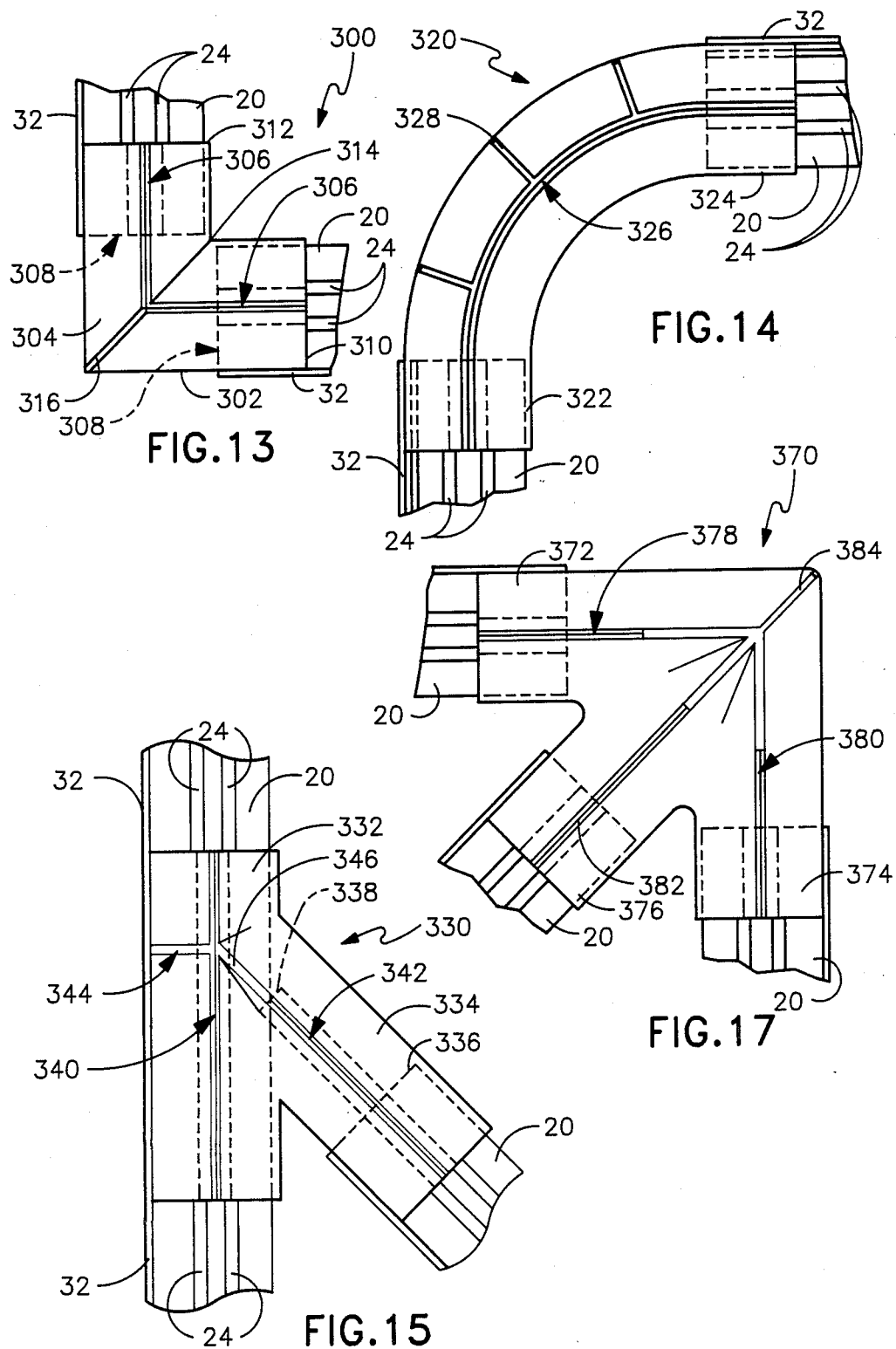

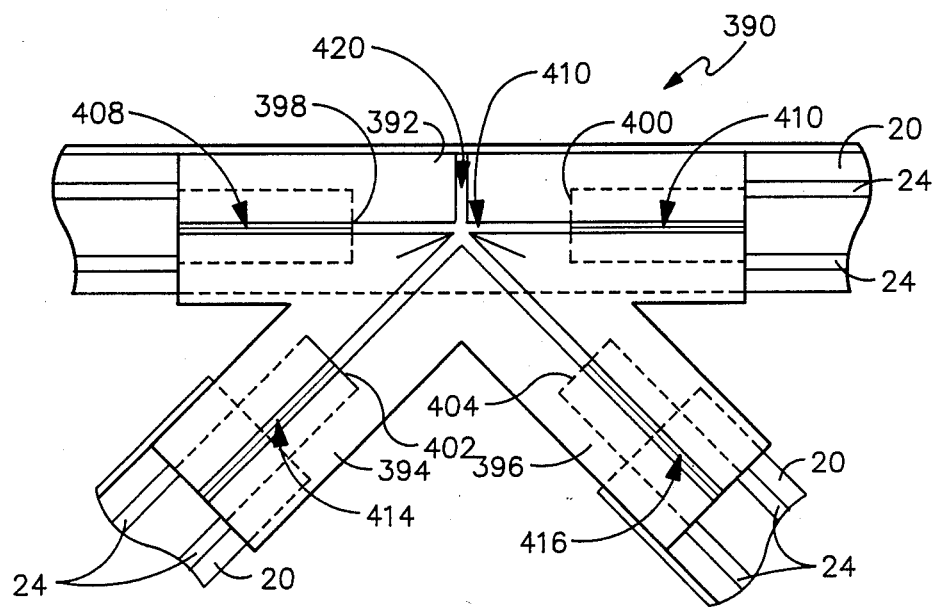
FIG.18
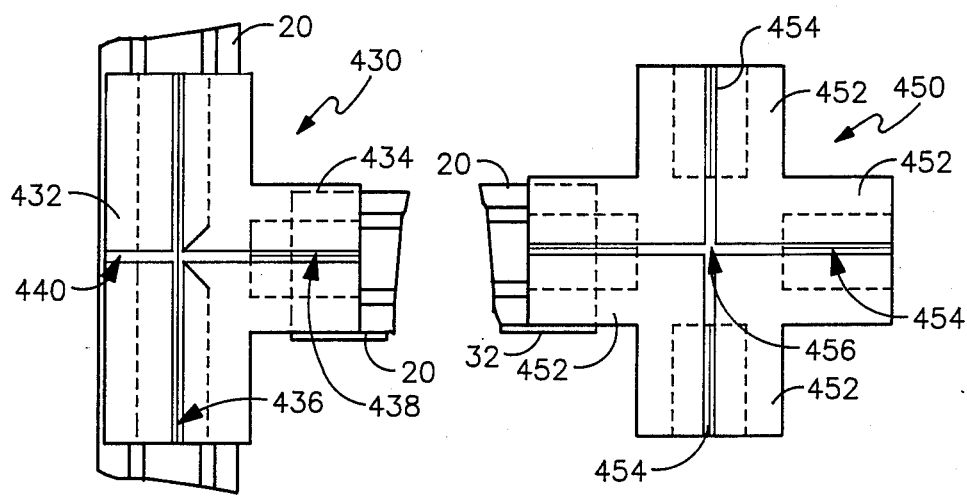
FIG.19
FIG.20

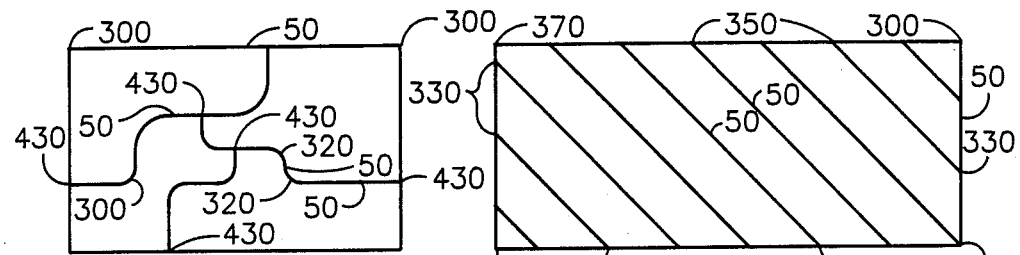
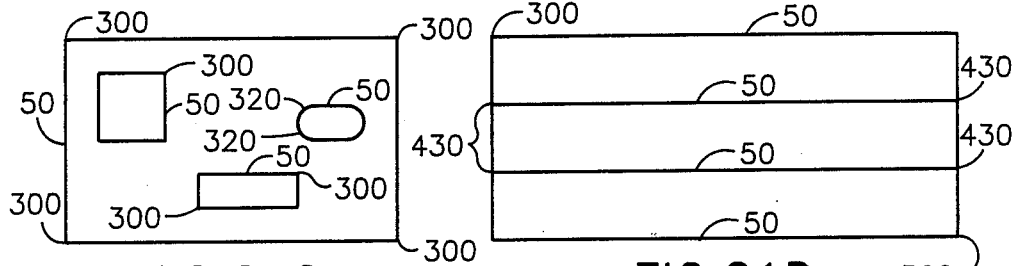
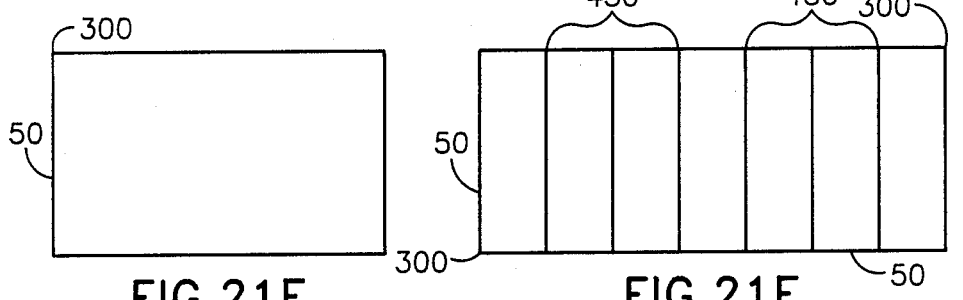
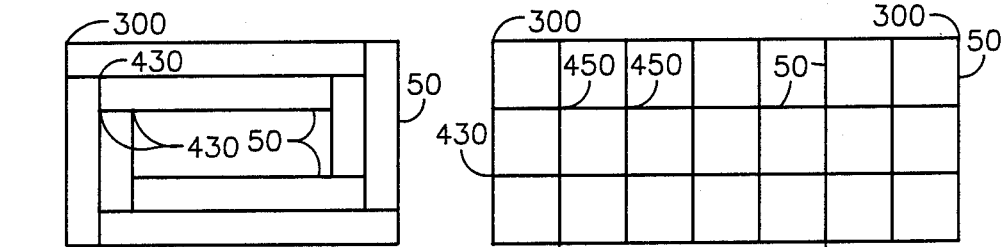
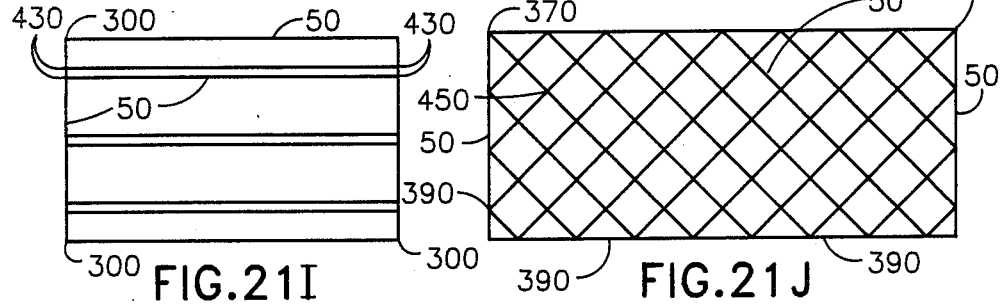

ASSEMBLY OF MOLDING STRIPS ADAPTED TO MOUNT FLEXIBLE COVERINGS ON SUPPORT SURFACES

BACKGROUND OF THE INVENTION

The present invention relates to the attachment of flexible coverings to a support surface, such as a wall and the like. Of specific interest is the ability to mount flexible fabrics onto interior walls in a quick convenient manner that provides a variety of design possibilities while enhancing the acoustic and thermal characteristics of the wall. This invention includes the structure of the molding strip assembly along with a system of molding strip assemblies and contour elements to define a framework that secures a flexible covering over an area to be covered. As such, the present invention is developed as an improvement over a pending application entitled Moulding Strips and Assembly Thereof for Mounting a Flexible Covering Onto a Support Surface, Ser. No. 705,796, filed Feb. 26, 1985 by the inventor of the present application.

Flexible wall coverings, such as fabric coverings, have enjoyed increasing popularity in recent times, even though the use of flexible coverings has origins centuries ago. The potential for such coverings to enhance the thermal and acoustic properties of a surface has also stimulated the desirability of flexible wall coverings, especially in conjunction with insulating materials and acoustical materials as part of a fabric covering system. With the increased popularity of these materials, designers have demanded increasing flexibility in presenting an asthetic covering. Thus, designers are always seeking to reach beyond the limitations of existing techniques to achieve different "looks".

In the prior art, there have generally been two techniques to mount flexible coverings over a support surface. The first of these techniques utilizes an adhesive that may be spread over the support surface with the flexible covering being relatively permanently adhered to the support surface such in the manner of wall paper. Although this technique securely mounts the covering to a wall surface, it has several drawbacks. First, as a result of its relative permanency, the removal of the flexible covering often damages the wall thus necessitating costly repairs. Further, any imperfections in the wall surface will show through the fabric or flexible material attached by the adhesive.

The second technique, and the technique to which this invention is directed, employs a framework of mounting strips or moldings which extend around and across the area to be covered. The flexible covering is secured to the mounting strips without being directly adhered to the wall surface. While this molding frame systems provide a structure that is less damaging to the wall surface, it has been found difficult to releasably and reliably secure the covering to the framework in a taut manner that avoids sagging or puckering of the fabric after a period of extended use. The above-referenced patent application, as well as the present invention, is specifically directed to solving this problem.

In addition to the above-referenced application, another framework system is disclosed in U.S. Pat. No. 3,657,850, issued Apr. 25, 1972 to Billarant. In this system, a molding strip is provided that includes a storage channel positioned adjacent an attachment flange or "sole" which may be used to attach the molding strip to the support surface. Cooperating filaform elements are provided on the web of the flexible covering so that they may be positively engaged by hooking elements on the sole. After such engagement, the marginal edge of the flexible material is stuffed through a narrow inlet and stored in a channel. The covering is retained in the channel by the narrow inlet. A T-shaped spline may be used to enhance the gripping force of the inlets jaws to give further strength to this retaining structure.

Another prior art structure is described in U.S. Pat. No. 4,018,260, issued Apr. 19, 1977 to Baslow, and supplemented by U.S. Pat. No. 4,053,008, issued Oct. 11, 1977 also issued to Baslow. In the assembly shown in these two patents, a framework of molding pieces is described which, when assembled, defines a pair of enclosed channels that extend around the periphery of an area to be covered by a flexible fabric. The inner channel forms a locking channel by having an upwardly disposed inlet which receives a looped portion of the fabric. A compressable spline may be forced into the inlet to resiliently trap the loop of fabric therein, and the excess edge portion of the fabric is then trained over the upper surface of the outer channel and stuffed through an inlet so that excess fabric is stored.

In U.S. Pat. No. 4,197,686, issued Apr. 15, 1980, also issued to Baslow, yet another framework system is disclosed using molding strips that are attached to the wall by an attachment flange. In this system, a single storage channel is provided which has an inlet opening forming a pair of jaws oriented at the edge of the molding opposite the flange. Here, the material is trained over the upper surface of the storage channel and inserted through the gripping jaws so that it may be retained therein. As is the case with all of these inlet systems, a problem of slippage may occur should substantial tension be placed on the material, with slippage also being possible with a change of materials.

In U.S. Pat. No. 3,833,046, issued Sept. 3, 1974 to Tombu, mating profile elements are provided that clamp to one another to retain a flexible covering to a wall, with this system also being directed to enclosing an area of a wall surface. In the Tombu patent, a pair of channels is formed by a two-piece construction so that an inner channel defines a storage region for a loop of flexible covering. The tension of the loop of the covering may be enhanced by the inclusion of a spline that is forced into this channel to hold the loop therein. An outer channel adjacent the outer edge of the area to be covered provides a storage region such that a trailing edge portion of the flexible covering may be trained over a raised face and stuffed through an inlet into a storage channel. The main distinguishing feature between the Tombu patent and U.S. Pat. No. 4,053,008 appears to be the one-piece construction of the latter. Tombu includes additional structure directed to a two-piece construction wherein a clamping element is mateably received by a lower element in a "snap-lock" manner.

Other prior art clamping structures are known, for example, U.S. Pat. No. 3,783,931, issued Jan. 8, 1974 to Assael and U.S. Pat. No. 4,403,642 issued Sept. 13, 1983 to Morris. Further, numerous clip and spline assemblies for attaching flexible window screens are known in the prior art, such as U.S. Pat. No. 1,772,780 issued Aug. 12, 1930 to Malone, U.S. Pat. No. 2,415,200, issued Feb. 4, 1947 to Willett et al, and U.S. Pat. No. 2,692,017, issued Oct. 15, 1954 to Lang.

Although these prior art structures accomplish the broad objective of mounting a flexible fabric to a wall, there remains a need for a molding strip assembly that is easy to install yet which permits a designer even greater flexibility in selecting the appearance to be achieved, for a wall covering not only provides utilitarian features, but may also become, for the designer, a work of art. In any such system, it is further a need that the manufacture of such system be economical so that it may readily compete with available systems yet, which system will allow ease of installation.

SUMMARY OF THE INVENTION

It is an object of the present invention to provide a useful and novel wall covering system which may be employed to mount a flexible covering to a support surface in a variety of design configurations.

It is another object of the present invention to provide a molding strip assembly that is easy to install by having one element thereof receiving a fabric and being attached to another element thereof which may be premounted to the support surface.

A further object of the present invention is to provide a molding strip assembly that may be used in conjunction with an insulating bat and/or an acoustical bat to cover a surface area in such a manner that heat and noise transfer is retarded.

It is yet another object of the present invention to provide a molding strip assembly that provides routing channels for items such as electrical lines, telephone lines and the like.

It is a still further object of the present invention to provide a molding strip assembly employing pre-fabricated contour elements so that a variety of design appearances may be obtained upon installation without the need for modification of the molding elements to construct design configurations heretofor difficult if not impossible to achieve.

It is yet another object of the present invention to provide a molding strip assembly that can be configured into a framework to mount a flexible covering over a desired area to completely cover that area in an asthetically pleasing manner by means of a flexible covering that is held by a framework by a secure, taut manner.

In order to accomplish these objects, a molding strip assembly as provided by the present invention which assembly is adapted to secure the edge of a flexible covering to a support surface. While the present molding strip assembly could be used to hang a single covering, such as a tapestry or the like, the present assembly is particularly adapted to be configured into a desired geometrical shape to define a framework around the area to be covered so that a fabric covering sized to cover the area may be securely held around its perimeter in a taut manner.

In its broad form, the present invention includes two mateable elements: a molding element and a mounting element. The molding element has a relatively flat base wall operative to receive fastening elements so that the molding element may be attached to a support surface. A retaining structure extends upwardly from the base wall to form a retaining channel. The mounting element has a raised support wall and a latching structure that extends downwardly from the raised support wall with the latching structure adapted to be received within the retaining channel to secure the mounting element onto the molding element. A first sidewall extends downwardly from the raised support wall in spaced relation to the latching structure to further orient the support wall with respect to the base wall of the molding element. The latching structure is sized for mated insertion into the retaining channel and the latching structure is adapted to receive a peripheral edge portion of the covering to retain the edge portion in a fixed relation with respect to the retaining channel.

In one preferred form of the present invention, the molding element has a pair of spaced-apart, resilient retaining walls which extend upwardly from a central portion of the base wall and initially converge towards one another to define the retaining channel. A locking wall extends upwardly from one edge of the base wall so that it may aid in locking the mounting element. In this preferred form, the mounting element has first and second raised support walls which are interconnected to one another by a channel structure formed by a pair of downwardly projecting channel side walls and a channel bottom wall. The channel structure thus defines the latching structure sized for engagement in the mounting channel between the retaining walls so that the mounting element is snap-fit into the molding element. The channel structure forms an interior storage channel to receive the peripheral edge of the covering.

To this end, upon insertion of the channel structure into the retaining channel, the resilient retaining walls deflect from one another and then snap back into position around the channel structure. In order to further position the raised support walls, the mounting element has a first wall that extends downwardly from the first support wall to terminate at an edge adjacent the base wall, and a second side wall which extends downwardly from the second support wall to terminate adjacent to base wall, with the second side wall being spaced from the channel structure such that it is biased against the locking wall when the mounting element is in the locked position. Thus, the interaction between the locking wall and the second side wall, along with the channel structure and retaining channel, secure the mounting element to the molding element while positioning the first and second support walls.

Fabric may be secured within the storage channel either before or after the molding element and the mounting element are locked together. Thus, the flexible covering extends over at least one of the first and second support walls to be mounted within the storage channel. If desired, the other of the support surfaces may be provided with a decorative covering, or an edge portion of the flexible covering may be trained over the other of the support surfaces and either be wrapped underneath the molding element or placed between the locking wall and the second side wall.

In the preferred embodiment of the invention, additional structural features are provided to enhance this basic molding system. For example, it is preferred that the retaining walls of the molding element, after first converging towards one another, diverge to form an expandable mouth for ease of insertion of the locking structure into the retaining channel. The side walls of the retaining channel are preferrably biased against each other and serrated to provide a jaw-like inlet so that the flexible covering may be tightly held within the storing channel. Likewise, the facing surfaces of the molding element and the second side wall of the mounting element have serrations so they will grip against one another to resist removal of the second side wall. To enhance this gripping action, an upstanding rib is formed in closely-spaced parallel relation to the locking wall and is separated therefrom a distance approximately equal to the thickness of the second side wall in order to define a narrow groove that receives the free edge of the side wall. Accordingly, the rib helps lock the second side wall against the locking wall so that, if desired, a trailing edge of the fabric may be inserted between the serrated faces and held thereby. To provide a larger target area for the narrow groove, the upward, free edges of the rib and the locking wall curve outwardly from one another thereby acting as guides for the free end of the second side wall as it is inserted into the groove.

In a modified form of the invention, the molding element includes a second locking wall extending upwardly from the base wall in closely-spaced parallel relation thereto to define a second groove. A base molding is provided as a third element of the assembly, with the base molding having a top wall and a base side wall that extends downwardly therefrom. The base side wall is sized for mated engagement in the second groove to secure the base molding element to the molding element so that the top wall projects oppositely the first and second support wall. A base support wall may extend downwardly from the top wall in spaced relation to the base side wall so that it is sized to abut the support surface to orient and support the top wall substantially planar to the support surface and generally in the plane of the first and second support walls. Thus, the base molding element defines routing channels for electrical lines, telephone cables, and the like.

As noted above, the preferred embodiment of the present invention is structured with the idea of forming a framework system about a selected geometrical shape. This framework includes selected lengths of the molding elements and the mounting elements which are cut and oriented with respect to one another to define the perimeter of the area to be covered. In many instances, the area is fairly large, such as a large auditorium wall, so that it is necessary to include inner molding elements and inner mounting elements along with the outer molding and mounting elements that define the framework. To simplify the attachment procedure, contour elements having the same general cross-section as the mounting elements are provided for the intersections of the inner and outer molding elements. Each of these contour elements generally have two or more legs that are interconnected to one another at desired angular orientations, either at sharp angles, or with arcuate curved mid-sections. Examples of the contour elements include right angle or contoured elements, right angle radius corner contour pieces, right diagonal contour pieces, left diagonal contour pieces, corner diagonal contour pieces, converging diagonal contour pieces, T-contour pieces and cross contour pieces. In each respect, the various legs are generally oriented at 45, 90 or 180 degrees with respect to one another so that a variety of design configurations may be readily obtained without the need to pre-cut the inner and outer molding elements or the inner and outer mounting elements.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 13 is a top plan view of the right angle corner contour piece shown in FIG. 12;

FIG. 14 is a top plan view of a radius corner contour piece;

FIG. 15 is a top plan view of a left diagonal contour piece;

FIG. 17 is a top plan view of a corner diagonal contour piece;

FIG. 18 is a top plan view of a converging diagonal contour piece;

FIG. 19 is a top plan view of a T-contour piece;

FIG. 20 is a top plan view of a cross-contour piece;

FIGS. 21a–21j are side views in elevation of sample design appearances which may be produced by the molding strip assembly according to the preferred embodiment of the present invention;

DETAILED DESCRIPTION OF THE PREFERRED EMBODIMENT

The present invention relates to mounting of flexible coverings to a support surface, and particularly relates to the attachment of fabric wall coverings in a variety of different designer selected configurations. The support surface may be any open area to be covered, the surface usually takes the form of an interior wall for which a fabric panel covering is desired. Accordingly, the present invention is specifically directed to novel and useful strip assemblies formed by mateable molding and mounting elements which may be cut and connected to one another so that, along with preformed contour pieces, are constructed into a framework that extends around the perimeter of the area to be covered; interior strip assemblies allow selected designs to be created. In addition, the present invention may be used to hang tapestries or other flexible coverings along one or more edges.

Figure 1:
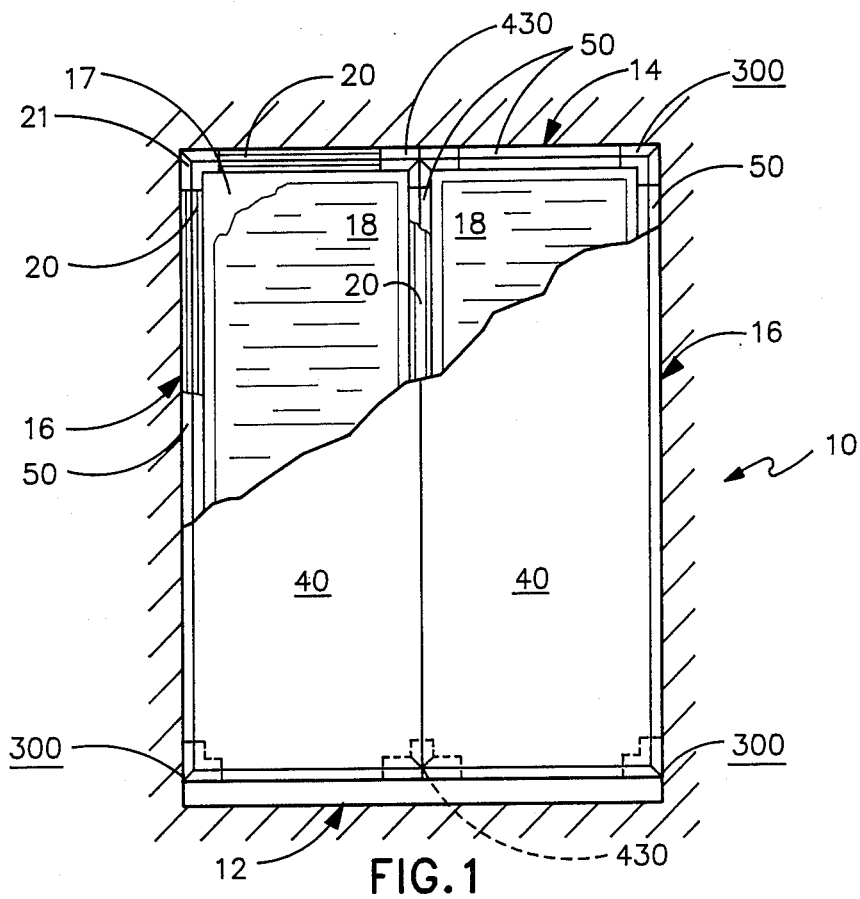
FIG. 1 is a front plan view of the wall coverage system according to the preferred embodiment of the present invention shown attached to the wall of a room.

While it should be appreciated that the framework formed by the molding strip assembly according to the preferred embodiment of the present invention may take any generally planar geometric shape, a representative square-shaped wall covering assembly is shown in FIG. 1. In this figure, a room 10 has a floor 12, a ceiling 14 and side walls 16. A molding strip assembly is mounted around a side wall bounded by floor 12, ceiling 14 and side wall 16 and includes a plurality of molding elements 20 which extend in a square shaped framework around room 10 and include an interior molding strip 45 vertically oriented between side wall 16. Thermal bats 18 are affixed to the wall within this framework, and a flexible covering in the form of fabric panels 40 extend across the framework elements 20 and the vertical element 20. Farbric panels 40 are secured by mounting elements 50, in the manner described below, with mounting elements 30 adapted to be releasably locked into molding elements 20. In addition, a right angle corner contour piece 300 is used to secure the fabric sheets 40 at the corners of the framework, and T-shaped contour pieces 430 are shown interconnecting the interior molding element 20 with the perimeter of the framework.

Figure 2:
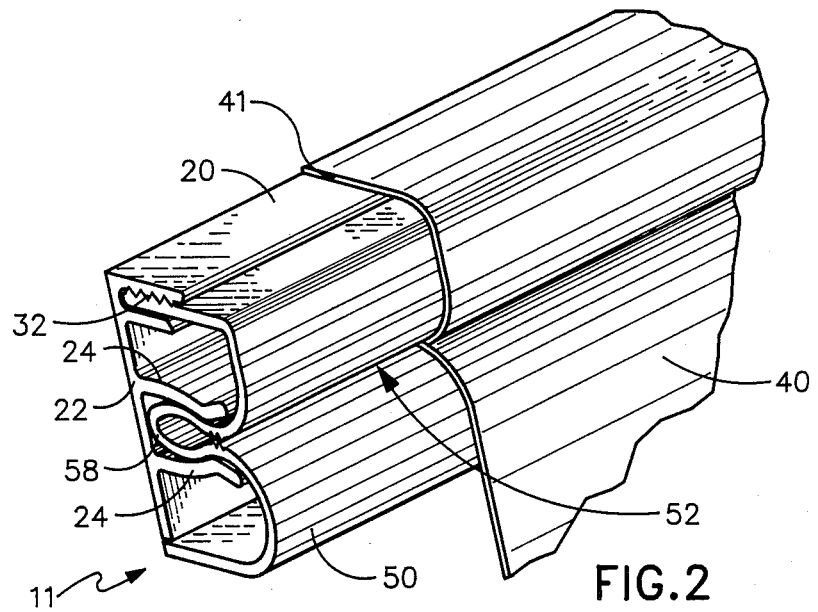
FIG. 2 is a perspective view of a mounting element shown in a locked position with a molding element and securing a flexible covering.

As is shown in FIG. 2, molding strip assembly 11 includes an elongated molding element 20 which releasably locks a mounting element 50 for attachment onto a support surface. Mounting element 50 secures a fabric panel 40 by receiving a peripheral edge portion adjacent an edge of fabric sheet 40 into the interior of mounting element 50 through an inlet 52.

Figure 3:
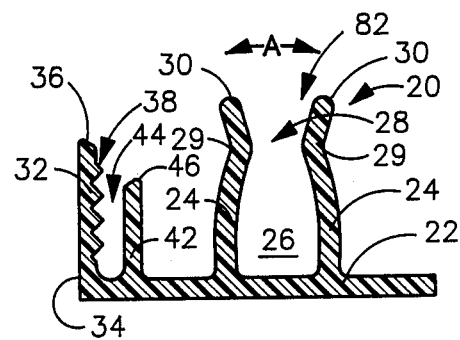
FIG. 3 is a cross-sectional view of the molding element according to the preferred embodiment of the present invention.
Figure 5:
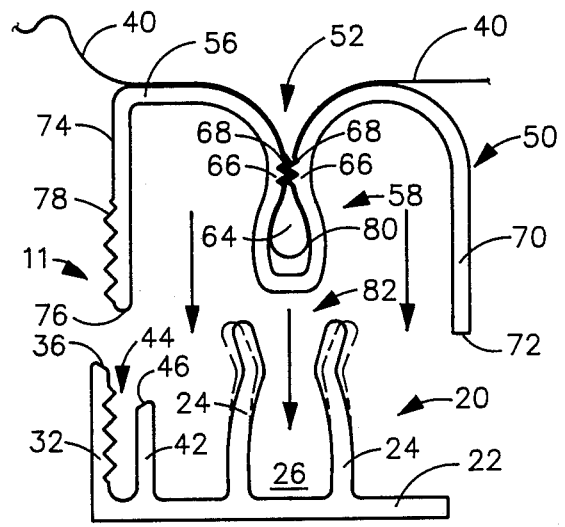
FIG. 5 is a cross-sectional view showing the mounting element of FIG. 4 securing a flexible covering with the mounting element in position for insertion into locked engagement with the molding element shown in FIG. 3.

The structure of molding element 20 is best shown in FIGS. 3 and 5, wherein molding element 20 is shown in cross-section. As is shown in these figures, molding element 20 includes a relatively flat base wall 22 that supports, along a central portion thereof, a pair of facing, spaced apart retaining walls 24. Preferably, molding element 20 is formed of a resilient plastic so that retaining walls 24 are resilient and may be deflected away from one another as shown by arrow "A". Resilient walls 24 define a retaining channel 26 that has an hourglass cross-section so that it has a narrowed midsection 28 formed by first converging portions 29 of retaining walls 24 followed by an outward arcuate divergence to free edges 30. A locking wall 32 extends vertically upwardly from base wall 22 at an edge 34 thereof to terminate in a free edge 36 that has a curved end. The surface of locking wall 32 facing retaining walls 24 is provided with serrations 38, and an upstanding rib 32 is closely spaced to locking wall 32 between wall 32 and walls 24 to define a narrow groove 44 between rib 42 and locking wall 32. Rib 42 has a free edge 46 that is curved so that oppositely curving edges 36 and 46 define a mouth for groove 44.

Figure 4:
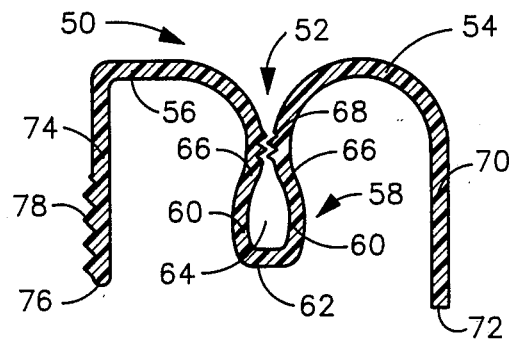
FIG. 4 is a cross-sectional view of the mounting element according to the preferred embodiment of the present invention.

Mounting element 50 is best shown in FIGS. 4 and 5, and includes a first raised support wall 54 and a second raised support wall 56 that are interconnected to one another by a latching structure in the form of a channel structure 58 formed by a pair of downwardly extending channel side walls 60 and a channel bottom wall 62. An interior storage channel 64 is thus formed, and interior storage channel 64 is accessible through inlet 52 formed between abutting channel side wall portions 66. Abutting portions 66 have complimentary facing serrations 68 which engage each other to define jaws for gripping a fabric sheet 40, as is shown in FIG. 5.

Mounting element 50 has a first side wall 70 that extends vertically downwardly from first based support wall 54 in spaced relation to channel structure 58 to terminate at a free edge 72. A second side wall 74 extends vertically downwardly from second raised support wall 56 substantially parallel to side wall 70 and also in spaced relation to channel structure 58. Second side wall 74 terminates at free edge 76 and is provided with outwardly facing serrations 78.

As is shown in FIG. 5, a peripheral edge portion 80 of fabric sheet 40 may be inserted through inlet 52 into interior storage channel 64 so that the peripheral edge portion 80 is locked by means of the gripping action between abutting portions 66 of channel side walls 60 and the gripping jaw-like action of serrations 68. Channel structure 58 is sized for insertion into retaining channel 26 by insertion through mouth 82. This insertion causes deflection of resilient retaining walls 24 away from one another, as is shown in phantom, as channel structure 58 is passed through mouth 82 into retaining channel 26.

Figure 6:
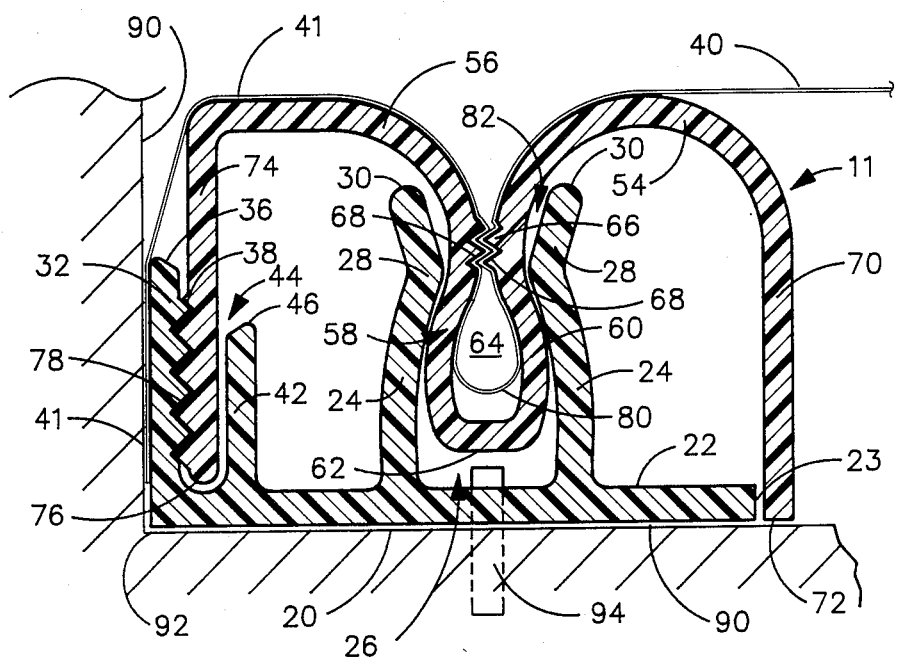
FIG. 6 is a cross-sectional view showing the preferred form of the present invention securing a flexible covering along an inside corner.
Figure 7:
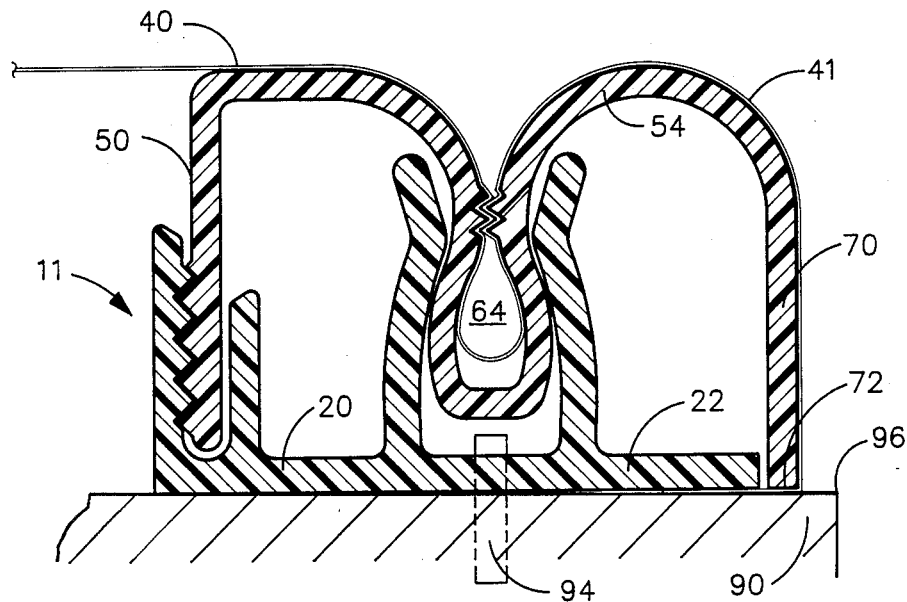
FIG. 7 is a cross-sectional view of the preferred embodiment of the present invention, in the locked position, showing the preferred method of attaching a flexible covering to an outside corner.

The mated relationship of mounting element 50 with molding element 20 is shown in FIGS. 6 and 7 which, respectively, illustrate the mounting of a fabric sheet 40 against an inside corner and along an outside corner of a support surface. For example, as is shown in FIG. 6, strip assembly 11 is positioned against an inside corner 92 of wall 90 by first attaching molding element 20 to wall 90 by means of any suitable fasteners, such as staples 94. As noted above, peripheral edge portion 80 of flexible fabric sheet 40 is inserted into interior storage channel 64 and is held in position by the gripping action of abutting portion 66 of channel side wall 60 and serrations 68. When channel structure 58 is in the locked position shown in FIG. 6, second side wall 74 is inserted into groove 44 so that serrations 78 face and mate with serrations 38 on locking wall 32. Accordingly, rib 42 and locking wall 32 are spaced from one another a distance approximately the thickness of second side wall 74.

Further, it should be appreciated that the distance between second side wall 74 and channel structure 58 is selected so that second side wall 74 is biased against locking wall 32 when channel structure 58 is received and secured in retaining channel 26. To this end, also, first side wall 70 is oriented in spaced relation to locking structure 58 so that, when channel structure 58 is in the locked position, free edge 72 of side wall 70 abuts wall 90 adjacent edge 23 of base wall 22. Free edge 76 of second side wall 74 is then located at the bottom of groove 44. The tail portion 41 of fabric sheet 40 may now be slipped between wall 90 and the exterior surface of locking wall 32 without the need of any tool other than a putty knife or straight edge, in this manner fabric sheet 40 is held taut across first raised support wall 54, with tail portion 41 being supported by second support wall 56.

By providing outwardly diverging free edges 30, bottom wall 62 of channel structure 58 may be inserted through mouth 82 of channel 26 so that side wall 60 may deflect retaining walls 24 from one another to allow insertion of channel structure 58 therein. Further, by providing curved free edges 36 and 46, free edge 76 of second side wall 74 is guided into groove 44. It should further be appreciated from a review of FIG. 6, that, when free edge 76 is at the bottom of groove 44 and free edge 72 abuts wall 90, bottom wall 62 is spaced a sufficient distance above bottom wall 22 so that fastener 94 does not contact bottom wall 62 and thereby interfere with the insertion of channel structure 58 into retaining channel 26.

The mounting of fabric sheet 40 along an outside corner 98 of wall 90 is shown in FIG. 7, and it should be appreciated that the securing of mounting element 50 into molding element 20 is the same as that described with respect to FIG. 6. In FIG. 7, however, channel assembly 11 is positioned so that free edge 72 of side wall 70 is oriented adjacent corner 96 so that tail 41 may be trained over raised support wall 54, downwardly along side wall 70, and tucked underneath bottom wall 22 between bottom wall 22 and wall 90. Thus, fabric sheet 40 extends across the area to be covered, is locked into channel 64, and then extends around mounting element 50 so that fabric extends along mounting element 50 to a location immediately adjacent corner 96.

Figure 8:
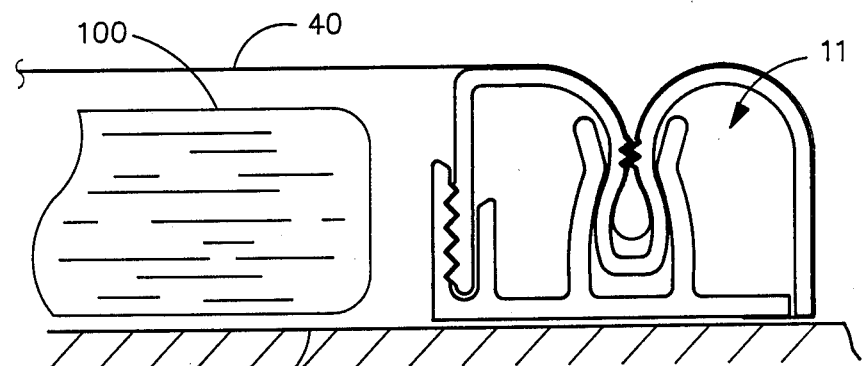
FIG. 8 is a cross-sectional view showing the mounting assembly according to the preferred embodiment of the present invention mounted on a wall and supporting a flexible covering in combination with an insulating bat.
Figure 9:
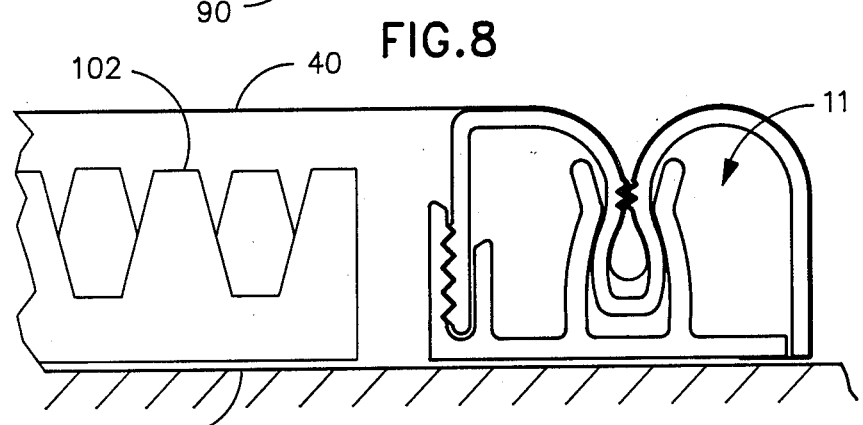
FIG. 9 is a cross-sectional view of the mounting assembly according to the preferred embodiment of the present invention shown mounted on a wall to secure a flexible covering in combination with an acoustical bat.

It should now be appreciated that the desired area to be covered may be provided with a perimeter framework of strip assemblies 11 formed by lengths of outer molding elements 20 and outer mounting elements 50 that may be locked together. Where either a large area is to be covered or design variety desired, inner strip assemblies 11 constructed of inner molding and mounting elements may be fastened across the perimeter framework. Additionally, fabric sheet 40 could be defined by a plurality of separate fabric panels. Insulating bats or acoustical bats may be placed on the interior of the framework with these bats then being covered by a fabric sheet 40 held by the strip assemblies in the manner described above. The use of strip assembly 11 with a thermal bat 100 is shown in FIG. 8 wherein bat 100 is mounted to wall 90 between wall 90 and fabric panel 40. Likewise, the use of strip assembly 11 with an acoustical bat 102 is shown in FIG. 9 wherein bat 102 is mounted to wall 90 between wall 90 and fabric panel 4.

Figures 10, 11:
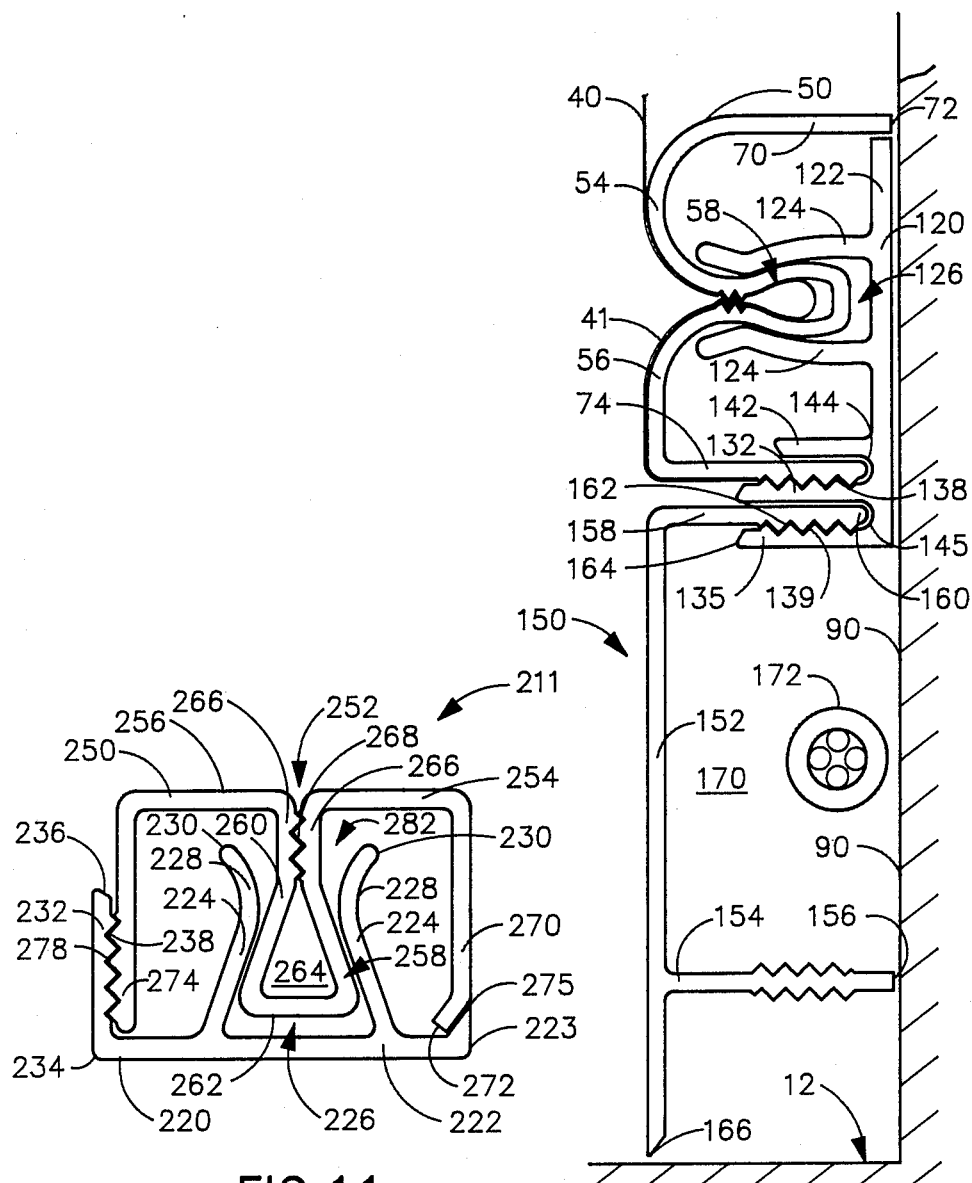
FIG. 10 is a cross-sectional view of an alternate embodiment of the molding element used with the mounting element according to the preferred embodiment and also used in conjunction with a base molding attached thereto.
FIG. 11 is a cross-sectional view of another alternate embodiment of the molding element and an alternate embodiment of the mounting element.

A modified mounting element 120 is shown in FIG. 10 with this mounting element 120 adapted to permit the use of a supplementary base element 150. As is shown in FIG. 10, molding element 120 is formed similarly with molding element 20, and has a base wall 122 which mounts a pair of upstanding resilient retaining walls 124 that are constructed the same as retaining walls 24, described above. An upstanding locking wall 132 projects upwardly from base wall 122 in spaced relation to retaining walls 124 and an upstanding rib 142 is formed substantially parallel to locking wall 132 in closely spaced relation thereto to define a groove 144 therebetween. Retaining walls 124 define a retaining channel 126 which is adapted to receive a locking structure 58 of mounting element 50, described above. Thus, side wall 74 of mounting element 50 is insertable into groove 144 and is locked therein by means of serrations 138 on locking wall 132, and tail 41 of fabric 40 is retained at an inner region between walls 74 and 132. A second locking wall 135 is positioned in closely spaced relation to locking wall 132 on a side thereof opposite rib 142. Locking walls 132 and 135 thus define a second groove 145. Second locking wall 135 has serrations 139 facing locking wall 132.

Base molding element 150 has a top wall 152 that is supported against wall 90 by means of a base support wall 154 having a free edge 156 that abuts wall 90. Base support wall 154 has a height such that top wall 152 is positioned a distance from wall 90 that is equal to the distance of support walls 54 and 56 from wall 90 when mounting element 50 is in the locked position with respect to molding element 120. Base molding element 150 has a downwardly projecting base side wall 158 that has a free edge 160 adapted to be inserted into groove 145 so that free edge 160 is adjacent the bottom of groove 145. Side wall 150 is provided with serrations 162 which mate with serrations 139 so that side wall 158 is lockably engaged between locking wall 135 and locking wall 132 in groove 145. To facilitate insertion of side wall 158 into groove 145, free edge 164 of locking wall 135 is curved to provide an entry way for groove 145. Top wall 152 terminates in a free edge 166 opposite side wall 158 so that edge 166 may abut floor 12 when side wall 158 is locked by molding element 120. In this manner, a routing channel 170 is defined between wall 90, top wall 152, side wall 158 and support wall 154. Routing channel 170 may be used to route electrical lines, such as telephone cable 172, so that cable 172 is hidden from view yet is readily accessible by removal of base molding element 150.

A second alternate embodiment of the molding strip assembly is shown in FIG. 11 wherein strip assembly 211 is formed by molding element 220 and mounting element 250. Moulding element 220 has a base wall 222 from which a pair of upwardly extending resilient retaining walls 224 extend. Retaining walls 224 define a retaining channel 226 and include facing mid-sections 228 formed as retaining walls 224 converge towards one another. Retaining walls 224 are upwardly divergent from mid-sections 220 to define a mouth 282, with retaining walls 224 terminating at free edges 230. An upstanding locking wall 232 is formed along edge 234 of bottom wall 222 and terminates in a curved free edge 236. Locking wall 232 is provided with serrations 238.

Mounting element 250 is similar to mounting element 50 except that first and second support walls 254 and 256 are relatively planar and are parallel to bottom wall 222 of molding element 220 when mounting element 250 is in the locked position with respect to molding element 220. To this end, support walls 254 and 256 are interconnected by a downwardly extending channel structure 258 formed by a pair of side walls 260 that define a triangularly shaped interior storage channel 264 by being interconnected by a channel bottom wall 262. Channel side walls 260 have abutting portions 266 provided with serrations 268, and an inlet 252 is thus provided for interior storage channel 264. Channel structure 258 is adapted to be received in retaining channel 226 so that molding element 220 and mounting element 250 are in a locked position. To this end also, support wall 256 has a downwardly extending side wall 270 that terminates in an inwardly turned edge 272 adjacent edge 223 of bottom wall 222. A second side wall 274 extends downwardly from second support surface 256 and is spaced from channel structure 258 so that, in the locked position, side wall 274 is biased against locking wall 232. Side wall 274 is provided with serrations 278 which mate with serrations 238 in the manner described with respect to the preferred embodiment. Inwardly turned edge 272 is adjacent bottom wall 222 at edge 223 when strip assembly 211 is in the locked position and rests against shoulder 275. Shoulder 275 and edge 272 cooperate to give structural rigidity for preventing unwanted opening of inlet 252.

Figure 12:
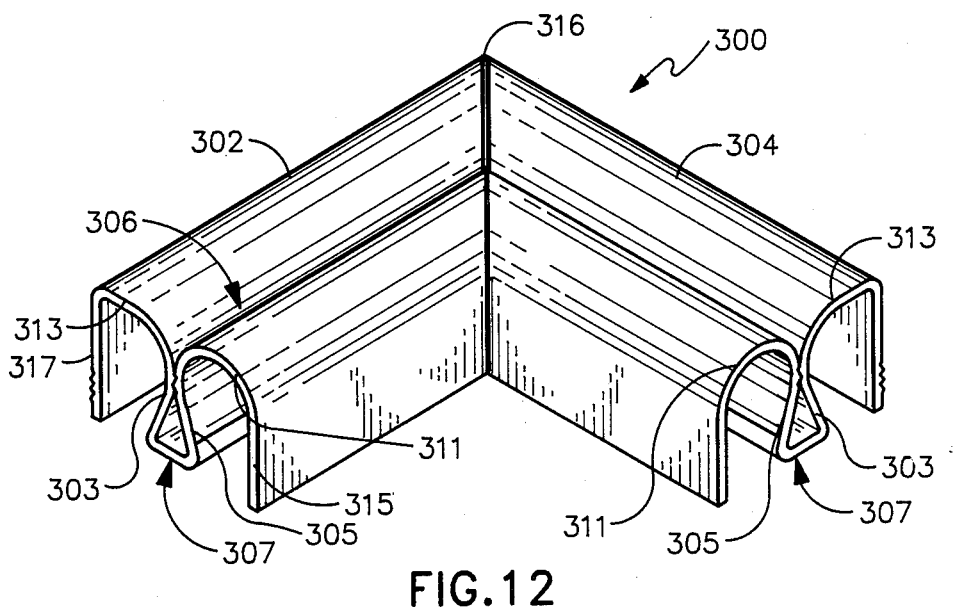
FIG. 12 is a perspective view of a right angle corner contour piece.

While the above structure provides the basic system for forming a framework around an area to be covered so that a flexible covering can be mounted over an area in a taut manner, the ease of installation and design variety may be achieved by employing prefabricated contour pieces such as the contour pieces shown in FIGS. 12-20. In FIG. 12, a perspective view of a right angle corner contour piece is shown, while FIGS. 13-20 show top plan views of the various contour pieces, and it should be appreciated that the cross-section of each contour element may be the same as the cross-section of the mounting element, such as shown in FIG. 4 or representatively by the contour piece of FIG. 12. Thus, each contour element has a latching structure insertable into the retaining channel and locked into position on molding elements 20 in a manner similar to each of mounting elements 50. Further, each contour element may be seen to include two or more legs oriented at angles to one another.

As is shown then in FIGS. 12 and 13, a right angle contour piece 300 is formed by first and second legs 302 and 304 oriented at right angles with respect to one another. Accordingly, a right angle inlet 306 is formed between the channel side walls 303 and 305 of the latching or channel structure 307, which is the same as channel structure 58 described above. Contour piece 300 thus includes third and fourth raised support walls 311 and 313 which are connected to one another by means of channel structure 307, and a pair of sidewalls 315 and 317 extend downwardly from support walls 311 and 313, respectively, in the manner described with respect to sidewalls 70 and 74. As is shown in FIG. 12 and in FIG. 1, when right angle contour piece 300 is utilized, it is not necessary for molding elements 20 to extend completely under the entire surface of contour piece 300. Rather, as is shown in phantom, molding elements 20 may have squared off ends 308 for substantially the distance between edge 310 of arm 302 and edge 312 of arm 304 to corner 314. This leaves an open region, such as region 21 shown in FIG. 1, between adjacent ends of the molding elements. Accordingly, right angle contour piece 300 may be locked into position by the snap-fitting of the associated channel structure of arms 302 and 304 into molding elements 20. A flexible covering may then be mounted thereto by inserting a peripheral edge portion through inlet 306, with any remaining pucker in the material being inserted underneath channel piece 300 through an open slot 316.

In FIG. 14, a radius corner contour piece 320 is shown having opposite arms 322 and 324 which project at right angles to one another. Again, molding piece 20 underlies an arm portion of radius piece 320 so that it may be locked onto molding pieces 20 by means of its associated channel structure between retaining walls 24. Radius contour piece 320 has an arctuate slot 326 adapted to receive a peripheral edge portion of a flexible wall covering with slot 326 defining an entryway into the interior storage channel of the channel structure of radius contour piece 320. Again, any excess material in the form of a pucker may be inserted into the interior of radius piece 320 through one or more slots 328.

Figure 16:
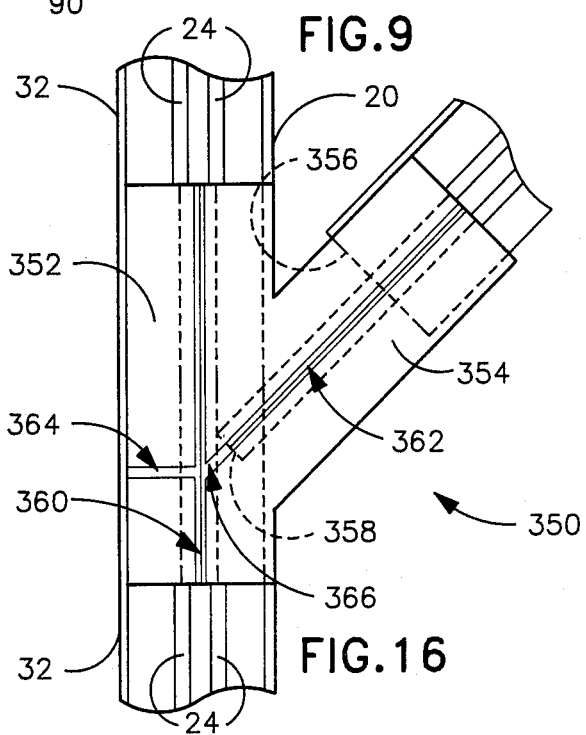
FIG. 16 is a top plan view of a right diagonal contour piece.

FIGS. 15 and 16 show left and right diagonal contour pieces, respectively. As is shown in FIG. 15, left diagonal contour piece 330 includes a main body portion 332 that is adapted to be received by a molding element 20 extending completely thereunder. To this end, main body 332 includes a channel structure that is received between retaining walls 24 of molding elements 20. A diagonal leg 334 projects from main body 332 at a 45° thereto and may be mounted on a similar molding element 20 that terminates at edge 336 so that it underlies an end portion of leg 334. Leg 334 is provided with a channel structure that terminates, as is shown in phantom, at 338, so that the channel structure of leg 336 does not interfere with retaining walls 24 of molding strip 20 that underlies main body 332. Main body 332 has a slot 340 adapted to allow insertion of a peripheral edge portion of a flexible covering into its channel structure, and, similarly, leg portion 334 is provided with an inlet 342. First and second slots 344 and 346 are provided at a central location of the projected intersection of leg 334 with main body 332 to allow any excess material to be inserted underneath contour element 330.

As is shown in FIG. 16, right diagonal contour piece 350 includes a main body portion 352 that is adapted to be received by a molding element 20 extending completely thereunder. To this end, main body 352 includes a channel structure that is received between retaining walls 24 of molding elements 20. A diagonal leg 354 projects from main body 352 at 45° thereto and may be mounted on a similar molding element 20 that terminates at edge 356 so that it underlies an end portion of leg 354. Leg 354 is provided with a channel structure that terminates, as is shown in phantom, at 358, so that the channel structure of leg 356 does not interfere with retaining walls 24 of molding strip 20 that underlies main body 352. Main body 352 has a slot 360 adapted to allow insertion of a peripheral edge portion of a flexible covering into its channel structure, and, similarly, leg portion 354 is provided with an inlet 362. First and second slots 364 and 366 are provided at a central location to the projected intersection of leg 354 with main body 352 to allow any excess material to be inserted underneath contour element 350.

FIG. 17 is a top plan view of a corner diagonal contour piece that is a hybridization of the corner piece shown in FIG. 12 along with a diagonal piece such as shown in FIGS. 14 and 15. Here, corner diagonal contour piece 370 has right angle legs 372 and 374 that are bisected by a diagonal leg 376. Each of legs 372, 374 and 376 may be lockably received in an associated molding element 20 in the manner that now should be readily understood. Legs 372, 374 and 376 respectively, are provided with inlets 378, 380 and 382 to allow insertion of fabric into their respective channel structures, and, again, a slot 384 is provided for excess material.

FIG. 18 shows a top plan view of a converging diagonal piece of 390 that is a hybridization of left and right diagonal pieces 330 and 350. Converging diagonal piece 390 has a main body 392 that may be mounted at any convenient location along a single molding piece 20. A first diagonal leg 394 is oriented at a 45° angle to main body 392, and a second diagonal leg 396 is also oriented at a 45° angle with respect to main body 392, with legs 394 and 396 being oriented at right angles to each other. The channel structure of main body 392, shown in phantom, terminates at edges 398 and 400 and the channel structures of legs 394 and 396 terminate, as shown in phantom, at edges 402 and 404, respectively. In this manner, the channel structures do not interfere with retaining walls 24 on any of the molding elements 20. Main body 392 is provided with slots with inlets 408 and 410, and an open slot 412 extends between inlets 408 and 410. Leg 394 is provided with a slot 414, while leg 396 is provided with a slot 416 allowing the insertion of a flexible covering into the channel structure, and again a slot 420 may be provided to receive excess material.

FIG. 19 shows a T-contour piece 430 having a main body 432 that is received by a molding element 20, and a right angle leg 434 projects laterally thereof. Leg 434 also receives a molding element 20, so that T-contour piece 430 may be mounted to the respective molding elements 20. Main body 432 has a slot 436, while leg 434 has an inlet 438 adapted to receive the flexible material into its associated channel structure, and an excess fabric slot 440 is provided.

Finally, FIG. 20 shows a cross-contour piece 450 comprised of four identical legs 452 oriented at right angles. As is shown, by way of example, a leg 452 may receive and be locked by a molding element 20, with each of legs 452 being provided with an inlet 454 to receive fabric into their associated channel structures (not shown). An open, X-shaped slotted region 456 is centrally located on cross-contour piece 450 to receive excess material therein.

Based on the foregoing, it should be appreciated that, by using the contour pieces that are shown in FIGS. 12-20, great flexibility of design may be attained while maintaining ease of assembly and installation onto a support surface. FIGS. 21(a)-21(j) shows sample design configurations for fabric coverings on a rectangular wall. These samples are by way of example, since the possible configurations are limitless. Further, each of the FIGS. 21(a)-21(j) are labelled with their respective contour pieces in order to make clear the design construction.

Figure 22:
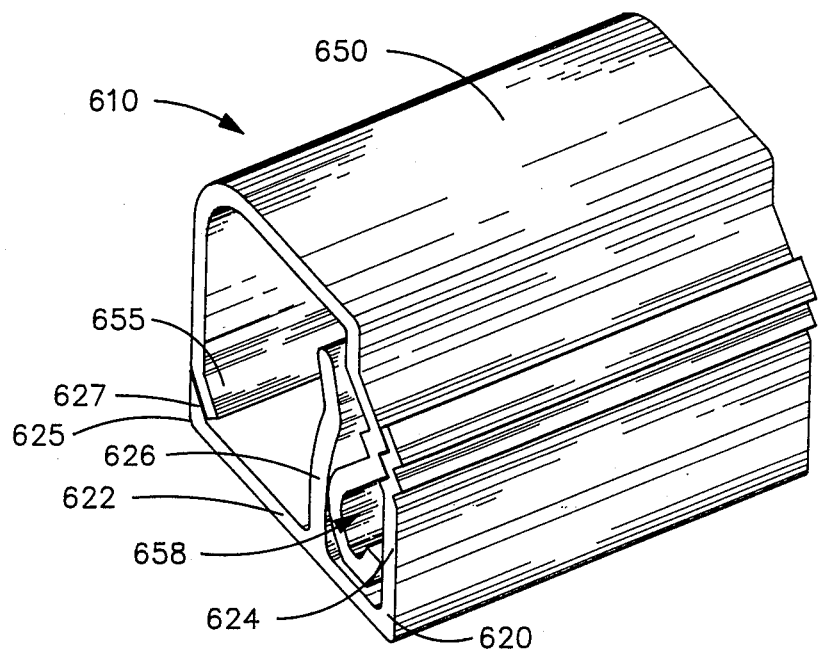
FIG. 22 is a perspective view of yet another embodiment of the present invention.
Figure 23:
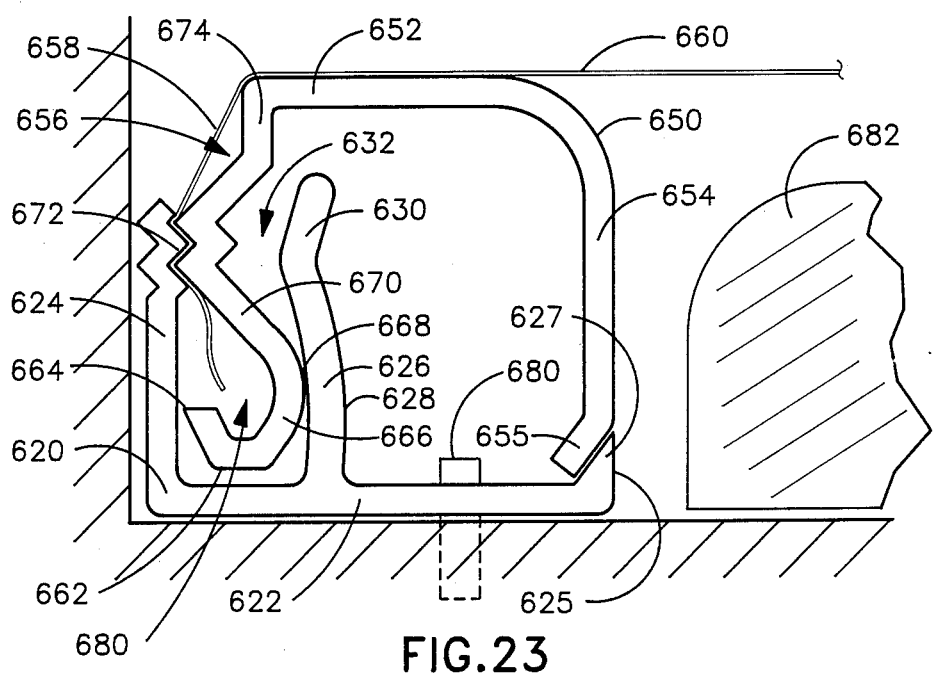
FIG. 23 is a cross-sectional view showing the mounting assembly of FIG. 22 mounted on a wall and supporting a flexible covering in combination with an insulating bat.

In all the embodiments shown in FIGS. 1-21, it should be noted that the inlet for the channel structure is located between a pair of support walls. When a covering is secured to a support surface by these assemblies, a detail or shadow line extends concentricly with the area to be covered, and is spaced from the perimeter of the area covered by a distance that corresponds to the width of the second support wall. In order to eliminate this detail line, an alternate embodiment of the present invention is shown in FIGS. 22 and 23. Here, molding assembly 610 is formed by means of a molding element 620 and a mounting element 650 that is secured to molding element 620 by means of a latching structure 658, described below.

With more particularity, molding element 620 includes a base wall 622 that includes an upwardly extending retaining structure or channel. In FIGS. 22 and 23, this retaining structure is formed by a locking wall 624 that extends upwardly along one edge of base wall 622 and a retaining wall 626 which extends upwardly in spaced relation to locking wall 624 from base wall 622. Retaining wall 626 is configured similarly to retaining walls 24, in the preferred embodiment, and includes a first portion 628 that converges toward locking wall 624 to terminate in an outwardly divergent end portion 630. Thus, retaining wall 626 and locking wall 624 define a retaining channel 632 therebetween. Base wall 622 has an edge 625 opposite locking wall 624 that includes an upwardly turned shoulder 627.

Mounting element 650 includes a single raised support wall 652 that is oriented above base wall 622 when mounting element 650 is secured to molding element 620 in the locked position shown in FIGS. 22 and 23. To facilitate this orientation, a first sidewall 654 extends downwardly from raised support wall 652 and terminates in an inwardly turned foot 655 adapted to abut shoulder 627 of molding element 620. A latching structure 656 extends downwardly from raised support wall 652 in spaced apart relation to first sidewall 654. Latching structure 656 is sized for mated insertion into retaining channel 632 in order to lock mounting element 650 onto molding element 620. Further, latching structure 656 is adapted to receive a peripheral edge portion 658 of flexible covering 660 to retain that edge portion in a fixed relation with respect to the retaining channel 632.

As is shown in FIGS. 22 and 23, mounting structure 656 is preferably formed by a second sidewall that terminates in a lower foot 662 that contacts locking wall 624 at point along location 664. This second sidewall includes a first segment 666 that extends upwardly from foot 662 to contact retaining wall 626 at location 668, as is shown in FIG. 23. A second sidewall section 670 extends upwardly from segment 666 to contact locking wall 624 at contact area 672. A third sidewall segment 674 extends upwardly from second segment 670 and extends between contact area 672 and support wall 656. It should thus be appreciated, from FIGS. 22 and 23, that latching structure 656 is configured to snap-fit into retaining channel 632 so that mounting element 650 is locked onto molding element 620.

As is shown in FIG. 23, a fastening element 680 may be used to fasten base wall 622 onto a support surface, and, when mounting element 650 is secured to molding element 620, a flexible covering 660 will be stretched across support wall 652 so that its peripheral edge 658 may be stuffed into region 680 in retaining channel 632. Contact area 672 is serrated to further grip flexible covering 660. The abutted relationship of foot 655 and shoulder 627 accordingly act to prevent separation of contact area 672. An insulating bat 682 may be provided as was described with respect to the preferred embodiment of the present invention.

Figure 24:
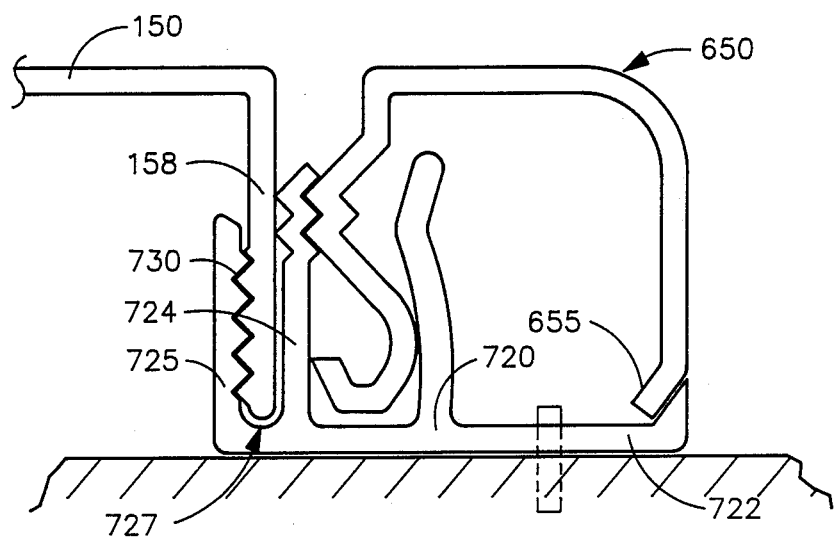
FIG. 24 shows a modification of the mounting assembly shown in FIG. 2 adapted to be used in conjunction with a base molding.

FIG. 24 modifies the molding element shown in FIGS. 22 and 23 so that base molding element 150 may be secured by mounting element 720 shown in FIG. 24. Here, base wall 722 includes a second locking wall 725 that is spaced from first locking wall 724 to define a relatively narrow groove 727 therebetween. Groove 727 is adapted to receive sidewall 158 of base molding 150 and, to this end, includes serrations 730. The remaining structure of base molding 720 is the same as that described with respect to FIGS. 22 and 23.

Figure 25:
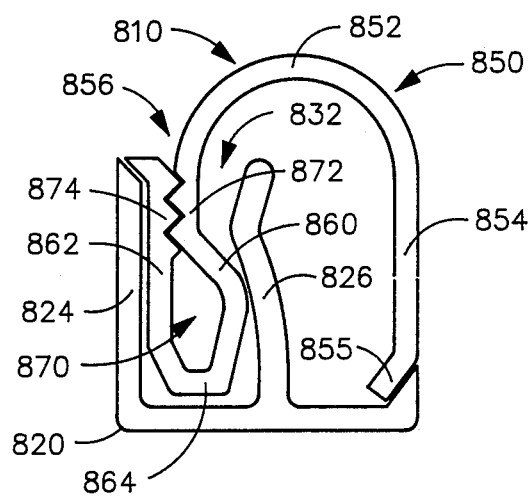
FIG. 25 is a cross-sectional view of yet another modification to the present invention.

A modification to the base molding and mounting elements of FIGS. 22 and 23 is shown in FIG. 25. In FIG. 25, base molding 800 includes a locking wall 824 and a retaining wall 826 that define retaining channel 832 therebetween. Molding element 850 includes a raised support wall 852 that is positioned by means of a first sidewall 854 that terminates in foot 855, and a latching structure 856 insertable into retaining channel 832. In this embodiment, though, latching structure 856 is formed by a first channel sidewall 860 and a second channel sidewall 862 that are connected to one another by a channel bottom wall 864. First channel sidewall 860 extends downwardly from support wall 852, and second channel sidewall 862 extends upwardly alongside first channel sidewall 860 to define a storage channel 870 therebetween. Thus, sidewall portion 872 of first channel sidewall 860, and sidewall portion 874 of second channel sidewall 862 contact one another to define a pair of serrated jaws through which an edge portion of the flexible covering may be inserted. Accordingly, it should be appreciated that latching structure 856 is similar in operation to channel structure 58 described with respect to the preferred embodiment of the present invention.

Figure 26:
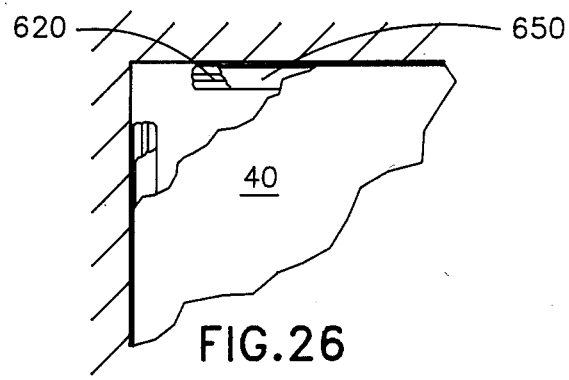
FIG. 26 is a front plan view, partially broken away, of a wall covering system utilizing the assembly shown in either FIG. 22 or FIG. 25.

When either molding assemblies 610 or 810 are used for a wall covering, as is shown in FIG. 26, the peripheral edge of the fabric extends completely across the area to be covered and a more detailed line is formed. It should further be appreciated that contour elements such as contour elements described with respect to FIGS. 12-20 may be provided to cooperate with the molding elements 620 and 820. An example of one such molding element is shown in FIG. 27, as a right angle corner contour piece 900, and it should be appreciated that all of the contour pieces described above could be provided with respect to this embodiment of the invention.

Figure 27:
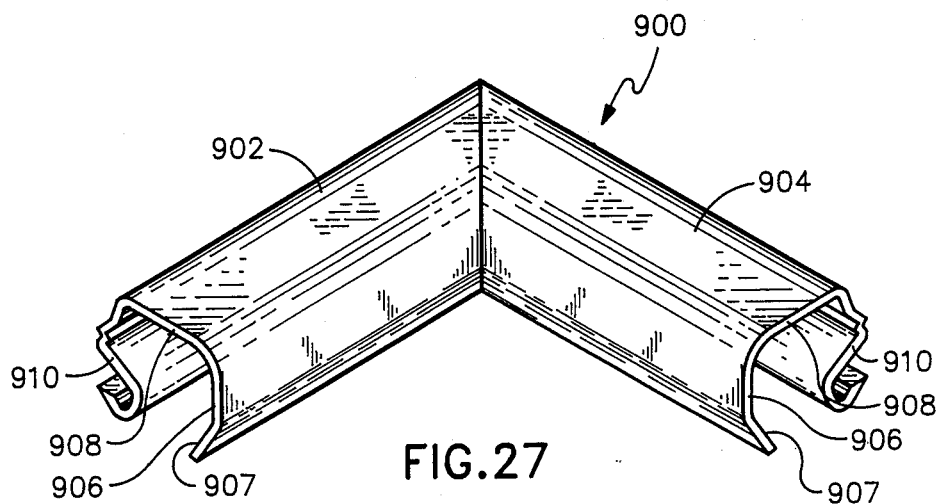
FIG. 27 is a perspective view of a right angle corner contour piece adapted to be used in conjunction with the mounting elements shown in either FIG. 22 or FIG. 25.

However, as is shown in FIG. 27, right angle corner contour piece 900 includes a first and second legs 902 and 904 which are oriented at right angles with respect to one another. Each of legs 902 and 904 includes a first sidewall 906 which extends downwardly from raised support wall 908 and terminates in an inwardly turned foot 907. A latching structure 910 depends downwardly from support wall 908 and is configured in the same manner as latching structure 656, described above. Accordingly, right angle corner contour piece 900 may replace mounting elements 650 at a right angle intersection of molding elements 620 for ease of installation. Thus, it should be appreciated that the prefabricated contour pieces may be employed at the various intersections between molding elements, such as molding elements 620 or 820.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A molding strip assembly adapted to secure an edge of a flexible covering to a surface to which the molding strip assembly is attached, comprising:

a molding element having a relatively flat base wall operative to receive fastening elements for attaching said molding element to the surface, a locking wall extending upwardly from said base wall, and a retaining wall extending upwardly from said base wall, said locking wall and said retaining wall shaped with respect to one another to define a retaining channel; and a mounting element having a raised support wall, a first side wall extending downwardly from said raised support wall and a latching structure extending downwardly from said raised support wall in spaced relation to said first sidewall, said latching structure sized for mated insertion into said retaining channel to lock said mounting element onto said molding element in a locked position, said latching structure including a first segment extending between and contacting the retaining wall and the locking wall in the locked position and means for supporting said first segment above said base wall when the latching structure is in the locked position, said latching structure operative along with said first sidewall to position said support wall above said base wall, said latching structure adapted to receive a peripheral edge portion of said covering to retain said edge portion in a fixed relation with respect to said retaining channel.

2. A molding strip assembly according to claim 1 wherein said latching structure is formed by a second sidewall extending downwardly from said raised support wall in spaced relation to said first sidewall, said second sidewall configured to extend between and contact both said locking wall and said retaining wall when inserted into said retaining channel, such that the contact area of said locking wall and said second sidewall define jaws through which the peripheral edge of the covering may be inserted and gripped whereby the covering is secured to the assembly.

3. A molding strip assembly according to claim 2 wherein the portions of said locking wall and said second sidewall at said contact area are provided with mating serrations to facilitate gripping of the covering thereby.

4. A molding strip assembly according to claim 3 wherein said second sidewall terminates at a lower end in a foot that contacts said locking wall adjacent said base wall when in the locked position, and has a second segment extending upwardly from said foot to contact said retaining wall, said first segment extending upwardly from said second segment to contact said locking wall at said contact area and a third segment extending upwardly from said first segment to said support wall, said foot and said second segment defining said means for supporting said first segment.

5. A system for covering a support surface, comprising:

outer molding elements adapted to be configured into a desired geometric framework on said support surface to define an area to be covered, each said outer molding element having a relatively flat base wall operative to receive fastening elements for attaching each said outer molding element to the surface, a locking wall extending upwardly from said base wall and a retaining wall extending upwardly from said base wall, said locking wall and said retaining wall shaped with respect to one another to define a retaining channel;

outer mounting elements securable to respective ones of said outer molding elements, each outer mounting element having a raised support wall, a first sidewall extending downwardly from said raised support wall and a latching structure extending downwardly from said raised support wall in spaced relation to said first sidewall, said latching structure sized for mated insertion in the retaining channel of its respective molding element to resiliently lock said mounting element onto said molding element in a locked position, each said latching structure including a segment extending between and contacting the retaining wall and the locking wall in the locked position and means for supporting said segment above the base wall of its respective outer molding element when the latching structure is in the locked position, said latching structure operative along with said first sidewall to position said support wall above its respective said base wall; and a flexible covering having dimensions slightly larger than the dimensions of the area to be covered to present excess edge portions around the outer perimeter of the framework, said covering being mounted across said framework by training the covering over the support walls and inserting said excess edge portions into the interior channels of said latching structures around said framework, each said latching structure adapted to receive a peripheral edge portion of said covering to retain said edge portion in a fixed relation with respect to its respective said retaining channel.

6. A system for covering a support surface according to claim 5 wherein said covering is formed of at least two panels having facing panel edge portions located interiorly of said area, and including interior molding elements and interior mounting elements constructed the same as said outer mounting elements, respectively, said facing panel edge portions insertable into the latching structure of the interior mounting elements to mount said panels thereto.

7. A system for covering a support surface according to claim 5 including an acoustical bat between said covering and said support surface.

8. A system for covering a support surface according to claim 5 including an acoustical bat between said covering and said support surface.

9. A system for covering a support surface according to claim 6 including contour elements securable to respective ones of said inner and outer molding elements at locations wherein said inner and outer molding elements intersect with one another, each said contour element having at least two leg portions oriented at an angle with respect to one another, each said leg portion having a leg sidewall extending downwardly from a second raised support wall and a latching structure extending downwardly from said second raised support wall in spaced relation to said leg sidewall and sized for mated insertion in the retaining channels of respective molding elements and for receiving and gripping a peripheral edge portion of the covering.

10. A system for covering a support surface according to claim 9 wherein said contour elements are selected from a group consisting of right angle contour pieces, radius corner contour pieces, left diagonal contour pieces, right diagonal contour pieces, corner diagonal contour pieces, converging diagonal contour pieces, T-contour pieces, and cross-contour pieces.

* * * * *